(12) United States Patent
Regan

(10) Patent No.: US 9,130,774 B2
(45) Date of Patent: Sep. 8, 2015

(54) DATA MIRRORING IN A SERVICE

(75) Inventor: Joe Regan, Pleasanton, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 337 days.

(21) Appl. No.: 12/317,548

(22) Filed: Dec. 23, 2008

(65) Prior Publication Data

US 2009/0129384 A1    May 21, 2009

Related U.S. Application Data

(63) Continuation of application No. 10/833,820, filed on Apr. 27, 2004, now Pat. No. 7,486,674.

(60) Provisional application No. 60/466,268, filed on Apr. 28, 2003.

(51) Int. Cl.
*H04L 12/46* (2006.01)
*H04L 12/26* (2006.01)
*H04L 12/723* (2013.01)
*H04L 29/06* (2006.01)

(52) U.S. Cl.
CPC ........ *H04L 12/4641* (2013.01); *H04L 12/2602* (2013.01); *H04L 43/00* (2013.01); *H04L 45/50* (2013.01); *H04L 69/168* (2013.01); *H04L 43/026* (2013.01); *H04L 69/08* (2013.01); *H04L 69/16* (2013.01)

(58) Field of Classification Search
CPC . H04L 12/2602; H04L 12/4641; H04L 43/00; H04L 69/168; H04L 45/50; H04L 43/026; H04L 69/16; H04L 69/08
USPC .................................. 370/390, 252; 709/224
See application file for complete search history.

(56) References Cited

U.S. PATENT DOCUMENTS

| | | | | |
|---|---|---|---|---|
| 4,399,531 | A * | 8/1983 | Grande et al. | 370/216 |
| 6,041,042 | A * | 3/2000 | Bussiere | 370/245 |
| 6,052,362 | A * | 4/2000 | Somer | 370/246 |
| 7,046,663 | B1 * | 5/2006 | Temoshenko et al. | 370/390 |
| 7,058,020 | B2 * | 6/2006 | Tavana et al. | 370/252 |
| 2002/0078174 | A1 * | 6/2002 | Sim et al. | 709/219 |
| 2006/0251085 | A1 * | 11/2006 | Kalkunte et al. | 370/400 |

* cited by examiner

*Primary Examiner* — Alpus H Hsu
*Assistant Examiner* — Anthony Luo
(74) *Attorney, Agent, or Firm* — Van Pelt, Yi & James LLP

(57) ABSTRACT

Data mirroring in a service such as a virtual private LAN service is disclosed. Data packets, segments, frames, or other forms of encapsulation may be mirrored off of a core network (e.g., IP, TCP) to one or more mirroring destinations without using a parallel network. Encapsulation techniques are provided that enable packets to be mirrored and transmitted across services such as VPLS, MPLS, and others to a mirror destination. Once received at the mirror destination, mirrored packets may be used for troubleshooting in a more efficient and less resource and time-consuming manner.

21 Claims, 8 Drawing Sheets

DATA MIRRORING IN A SERVICE

CROSS REFERENCE TO OTHER APPLICATIONS

This application is a continuation of U.S. patent application Ser. No. 10/833,820, entitled DATA MIRRORING IN A SERVICE, filed Apr. 27, 2004, now U.S. Pat. No. 7,486,674 which is incorporated herein by reference for all purposes, which claims priority to U.S. Provisional Patent Application No. 60/466,268 entitled PACKET MIRRORING IN A VIRTUAL PRIVATE LAN SERVICE ENVIRONMENT filed Apr. 28, 2003, which is incorporated herein by reference for all purposes.

FIELD OF THE INVENTION

The present invention relates generally to computer networks. More specifically, data mirroring in a service is disclosed.

BACKGROUND OF THE INVENTION

In computer networks, troubleshooting and administration are useful to ensure quality of service (QoS), reliability, and availability. Troubleshooting and monitoring functions may be implemented by using data mirroring capabilities. However, data mirroring may be expensive and limited.

Data mirroring is often implemented using a parallel network. Typically, data packets as they appear at a monitored node on a primary network are sent via the parallel network to a remote mirror node or destination. This parallel network approach requires additional hardware and software, as well as significant time and labor for setup and configuration of a mirror network. A parallel network typically is used to avoid having the mirror packets cause congestion or other performance problems on the primary network.

Therefore, it would be advantageous to be able to mirror data from a node on a primary network to a monitoring node using the primary network itself as the transport mechanism, instead of requiring a parallel network, without interfering with the delivery and processing of non-mirror data being sent via the primary network.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data mirroring over a network using services such as VPLS, MPLS, and others is disclosed. Data packets, segments, frames, or other data (hereinafter "packets") may be copied or mirrored from monitored node on a primary network to one or more mirror destinations without using a parallel network. For purposes of the following descriptions, "data mirroring" and "packet mirroring" are used interchangeably.

Figure 1:
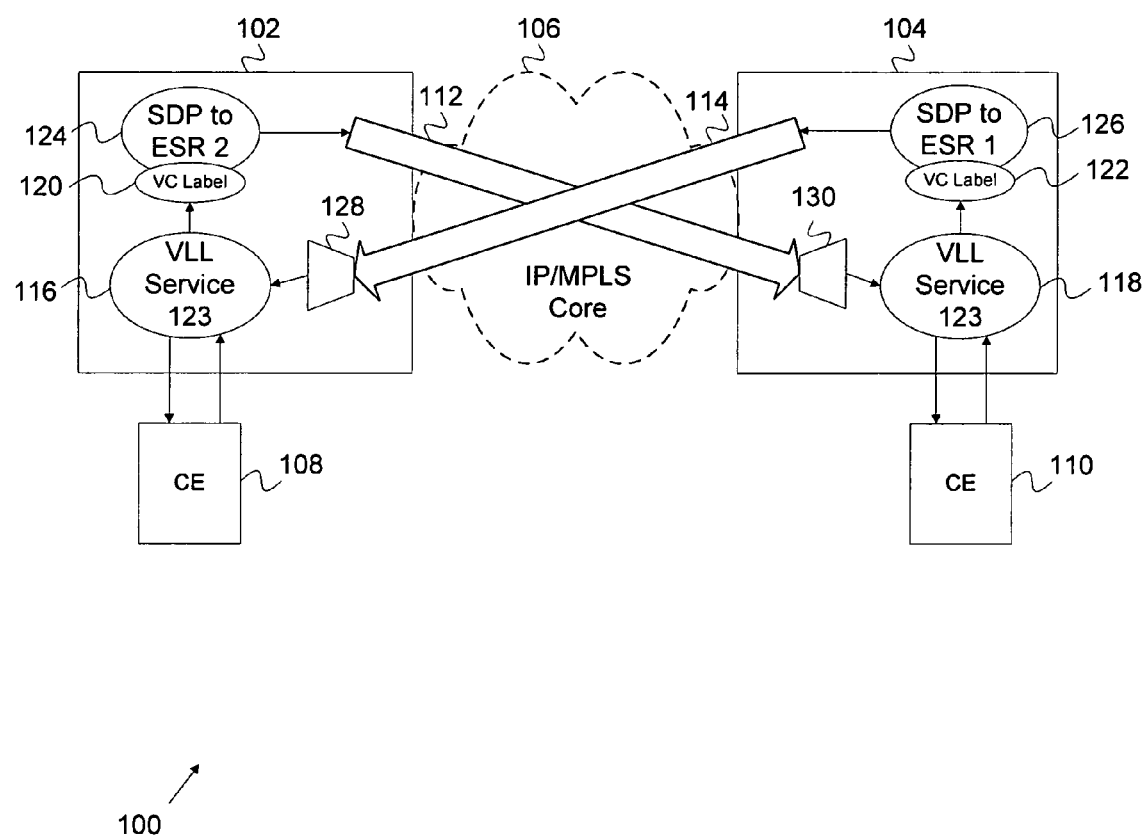
FIG. 1 illustrates an exemplary system having unidirectional transport tunnels interconnecting endpoints across a network.

FIG. 1 illustrates an exemplary system 100 having unidirectional transport tunnels interconnecting endpoints across a network. In this example, data routed across this network, e.g., data transported as part of a transparent LAN service (TLS) or similar service, may be mirrored to a mirror destination, as described in greater detail below. Edge service routers (ESRs) 102 and 104 are connected across network 106. In this example, network 106 is illustrated as having an IP/MPLS core network. In other embodiments, other types of core networks may be used. Customer edge routers (CEs) 108-110 send packets received from ESRs 102 and 104, respectively, to the final customer destinations to which they are addressed, such as MAC addresses within their respective customer networks. CEs 108 and 110 also received from associated customer nodes packets to be transported using virtual leased line (VLL) service 123 and deliver packets to ESRs 102 and 104, respectively, for transport. Unidirectional transport tunnels 112 and 114 provide the transport mechanism for service packet transmission. At each ESR, a service distribution point (SDP) is provided. In some embodiments, an SDP is a software object to which one or more services and one or more data transport tunnels may be bound. By binding the services to the SDPs, instead of binding the services directly to the transport tunnels, the services can be configured independently of the transport tunnels, and vice versa, thereby simplifying the provisioning and/or reconfiguration of each. In the example shown in FIG. 1, ESR 102 comprises SDP 124, which is shown as being bound to transport tunnel 112 to ESR 104 and as having VLL Service 123 bound to it via a service access point (SAP) 116, and ESR 104 comprises SDP 126, which is shown as being bound to transport tunnel 114 to ESR 102 and as having VLL Service 123 bound to it via a service access point 118. In some embodiments, a service access point comprises a software object used to send and receive via an interface to an external system, such as customer equipment connected via a port, data associated with a service. In some embodiments, a service access point may be used to provide two or more "virtual" ports associated with a single physical port.

In one embodiment, transport tunnel 112 comprises a label-switched path (LSP) associated with SDP 124 and transport tunnel 114 comprises an LSP associated with SDP 126. Here, a service such as VLL may be implemented using bidirectional service access points 116-118. In other embodiments, other types of service, e.g., VPLS, may be provided. Service packets are exchanged between service access points 116-118 and transported over unidirectional transport tunnels 112 and 114. In this example, virtual circuit (VC) labels 120 and 122 are applied to the service packets originating from service access points 116 and 118, respectively. SDPs 124-126 forward the service packets with the appended VC labels 120-122 across unidirectional transport tunnels 112 and 114 to ESRs 102-104. Upon receipt of the service packets with the prepended VC labels, de-multiplexers 128 and 130 identify the service packets as destined for service access points 116 or 118, based on VC labels 120-122, and route them accordingly.

In the example shown, a customer packet associated with VLL Service 123 that is sent by a source associated with CE 108 to a destination associated with CE 110, for example, would be sent by CE 108 to ESR 102. ESR 102 would receive the packet and associate the packet with VLL service 123 (e.g., based on the port on which it was received, encapsulation used, a label or other identifying information included in the packet, etc.). The service access point (SAP) 116 forwards the packet to SDP 124 (either directly in the embodiment shown or via an SDP mapping module, e.g., in an embodiment in which multiple services may use the same SDP) for transport to egress ESR 104. The SDP 124 encapsulates the packet for transport to ESR 104 via unidirectional transport tunnel 112, including by appending a VC label 120 that identifies the packet as being associated with VLL service 123. In an embodiment in which SDP 124 comprises two or more transport tunnels to ESR 104, SDP 124 selects a tunnel to be used to transport the packet to ESR 104. For example, in an embodiment in which the SDP 124 comprises two or more LSPs, the SDP 124 may be configured to bind a service to a particular LSP, e.g., a VLL service such as VLL Service 123, so that all traffic for the service is sent via the same LSP. For other types of service (e.g., VPLS or VPRN), the SDP may map packets to an LSP for transport by associating the packet with a "conversation" (i.e., a related set of packets being exchanged between two endpoints) and select an LSP associated with that conversation (e.g., to prevent packets from being delivered out of order, as might happen if different packets associated with a conversation were sent via different paths.) In some embodiments in which VPLS, VPRN, or similar service is being provided, the destination MAC address may be used to identify the LSP to be used to transport the packet. When the packet arrives at ESR 104, de-multiplexer 130 identifies the packet as being as associated with Service 123, e.g., based on the presence of VC label 120, and delivers the original (payload) packet to SAP 118 for processing. SAP 118 then delivers the packet to CE 110, for onward routing to its destination (e.g., host).

Service distribution points and service access points are described more fully in co-pending U.S. application Ser. No. 10/833,489, entitled USING NETWORK TRANSPORT TUNNELS TO PROVIDE SERVICE-BASED DATA TRANSPORT, filed Apr. 27, 2004, which is incorporated herein by reference for all purposes.

Mirroring data as it appears on the wire at a network node and sending the mirror data (e.g., mirror packets) to a remote destination via a mirroring service defined on a primary network is disclosed. As used herein, the terms "mirror packet" and "mirrored packet" refer to a packet to be sent to a mirror destination. A "mirror" or "mirrored" packet may be the original packet (e.g., if a copy is processed for sending to the destination to which the original packet is addressed) or a copy thereof, depending on the implementation and the point at which the mirroring occurs (e.g., ingress or egress). Packets may be mirrored either at ingress (i.e., in the form in which they are received at the node) or egress (i.e., in the form in which they leave the node). Mirror packets are sent to a remote mirror destination via the primary network, e.g., a transport tunnel through a core network, by using a mirror service defined for that purpose.

Figure 2:
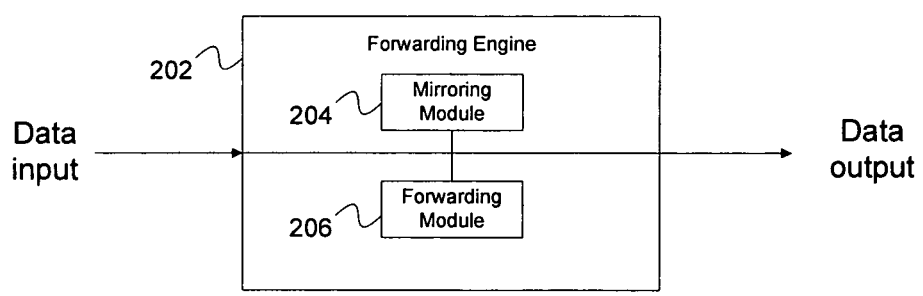
FIG. 2 illustrates an exemplary forwarding engine.

FIG. 2 illustrates a forwarding engine used in some embodiments. In this example, a forwarding engine 202 may be implemented as one or more modules used for both mirroring and forwarding packets from a router to a primary destination (i.e., a destination to which the packet is addressed) and a mirror destination (i.e., the place to which you want the mirror packets to be sent). Forwarding engine 202 has a mirroring module 204 and a forwarding module 206. The mirroring module 204 in some embodiments is configured to identify packets to be mirrored (e.g., based on criteria provided to the forwarding engine, e.g., in the form of a mirroring source object comprising such criteria) and cause the forwarding module 206 to forward such mirror packets to a mirror destination (e.g., SDP if remote, SAP if local). The forwarding module 206 uses address information to process and forward packets to their appropriate destination.

Forwarding engine 202 provides mirroring and forwarding capabilities for packets as they are "on the wire", either at ingress to or egress from the node being monitored. For example, if mirroring is done at ingress, in some embodiments the original ingress packet is preserved and sent to the mirror destination via a mirror service, as described more fully below, and a copy of the original packet is processed at the node. For example, in the case of a node that is a network router or switch, such as the edge service routers described above, a packet can be mirrored either at ingress, before the switch or router has processed it, or at egress, i.e., in the form in which it is sent out via an egress port of the switch or router once the switch or router has processed it. The ability to mirror at either ingress or egress is advantageous where significant processing is performed at the node.

Mirrored packets may be sent to a local or remote mirror destination. In the case of mirroring to a local mirror destination, in some embodiments mirror packets are sent out an egress port via a service access point (such as service access points 116 and 118 of FIG. 1) configured to serve as a local mirror destination. In the case of a remote mirror destination, a service distribution point associated with the remote destination may be identified as the mirror destination to which a remote forwarding engine at a monitored node sends mirror packets. A mirror service, referred to herein as a "mirror source", is configured to generate the mirror copies and send them to the mirror destination. The mirror packets are encapsulated and sent via a transport tunnel associated with the service distribution point. At the far end destination of the service distribution point, a de-multiplexer such as de-multiplexers 128 and 130 of FIG. 1 recognizes the mirror packets as being associated with a mirror service, based for example on a VC or other label, and forwards the mirror packets to a service access point associated with the mirror service. The service access point then provides the mirror packets via an egress port to an external system associated with the service (e.g., a network or system administrator console).

At the mirror destination, mirrored packets may be used to troubleshoot network conditions and problems, as the mirrored packets represent a complete copy of packets at the monitored network node. In the case of a switch, e.g., a copy may be obtained of packets as they enter (ingress) or exit (egress) the switch, enabling one to identify potential problems in the way the switch is processing and/or handling packets, for example.

Figure 3:
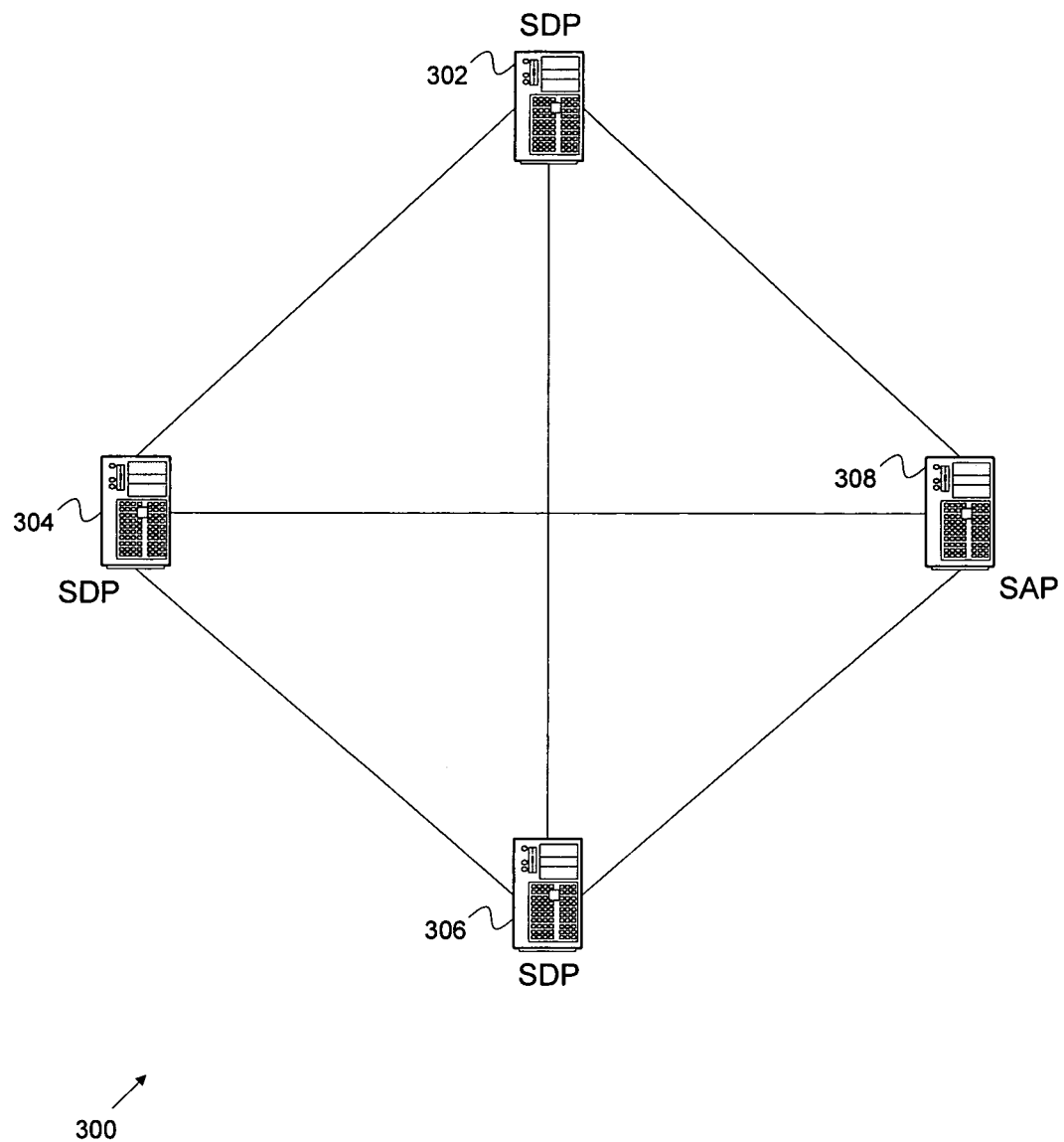
FIG. 3 illustrates an exemplary system for packet mirroring.

FIG. 3 illustrates a typical network in which packet mirroring may be used to monitor packets as they appear at a node. Edge routers 302-308 route data packets through network 300. In the example shown, it is assumed that the node to which mirror packets are to be sent (the mirror destination) is associated with router 308. An SAP at router 308 is configured to operate as a mirror destination service, i.e., to receive mirror packets from either a local or remote node and provide them as output via an associated egress port of router 308. SDPs provided at routers 302, 304, and 306 may be configured to send mirror packets to router 308 using a mirror source object or process to identify the packets to be mirrored and provide the mirror packets to a mirror destination associated with the mirror source object or process, e.g., via a transport tunnel associated with an SDP associated with the mirror destination. In some embodiments, the SDP associated with the node at which the mirror destination is located is identified to the local mirror source object or process as the destination to which mirror packets are to be sent. The SDP delivers the mirror packets to the far end, where they become associated with the mirror destination SAP as described above (e.g., based on a label or other identifier associated with the mirror service).

Figure 4:
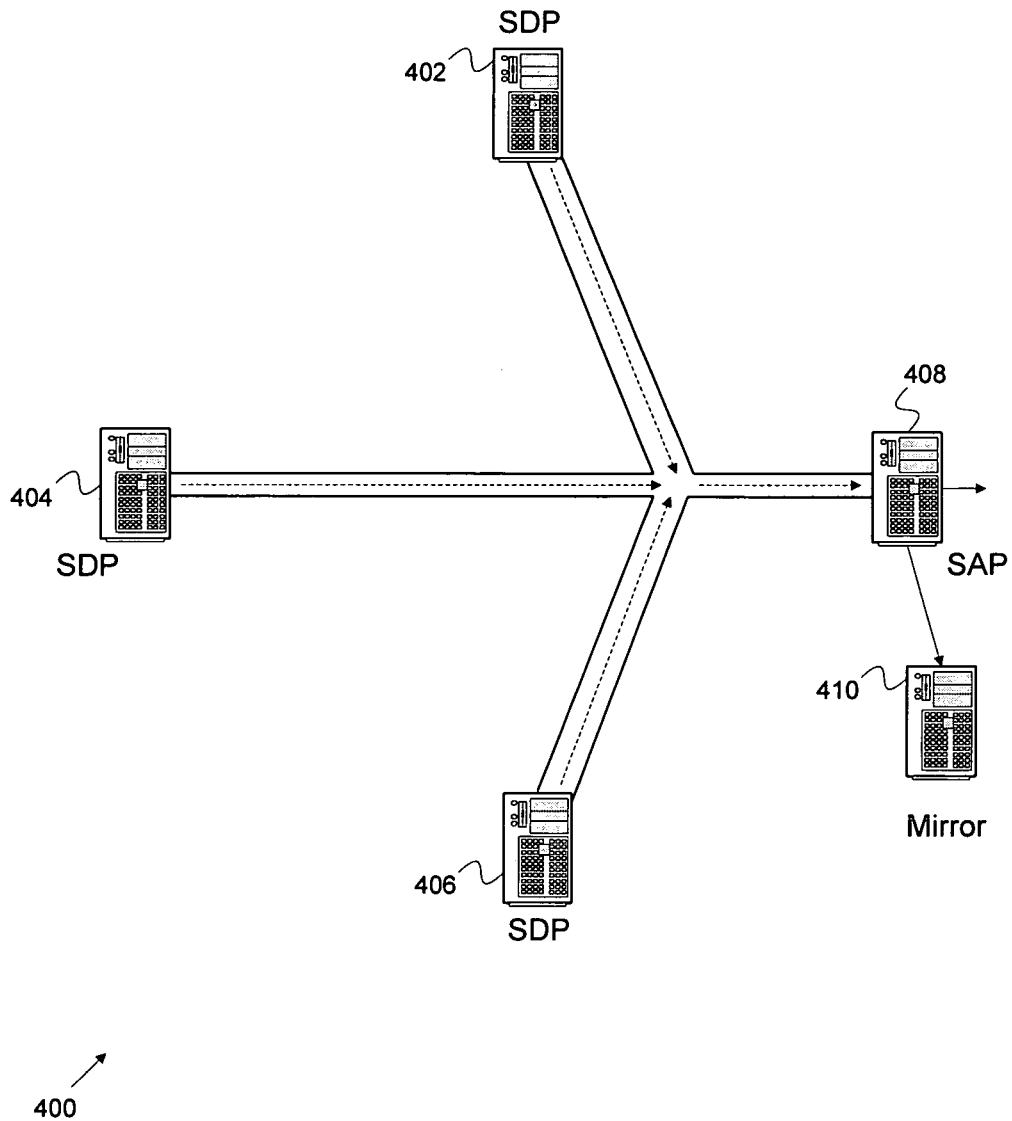
FIG. 4 illustrates an exemplary system for packet mirroring including a mirror destination.

FIG. 4 illustrates an exemplary system for packet mirroring via a mirror service. In this example, SDPs 402-406 and SAP 408 comprise a unidirectional mirror service. Transport tunnels associated with SDPs 402-406 may be used to route mirrored packets through SAP 408 to a host 410, e.g., a network administrator's console.

Unidirectional transport tunnel services such as VPLS, MPLS, or others may be used for routing mirrored packets to a mirror destination such as host 410. Host 410 may be in direct or indirect data communication with SAP 408. Here, packets may be routed across unidirectional service tunnels from SDPs 402-406 to SAP 408. Additional encapsulation such as added headers are attached to original packets (ingress) or copies (egress) to route them to SAP 408. The point at which packets are mirrored determines the type of packet handling.

Using a mirror service configured to send mirror packets via a primary network could increase congestion on the primary network, e.g., by interfering with the ability of a network to fulfill quality of service guarantees for transport services (e.g., VLAN) provided via the primary network. In some embodiments, the effect of mirror service traffic is minimized by "slicing" oversized mirror packets, which reduces processing and time requirements, alleviating performance impacts. Mirror packets are truncated prior to being sent to a mirror destination. Truncation minimizes replication and tunneling overhead associated with transmitting packets to a mirror destination. In some embodiments, rate limiting is used to minimize the impact of mirror service packets on the performance of other services being provided using the network by limiting the rate at which mirror packets are sent via the mirror service. Rate limiting may be implemented with user or system specified limits, and may be dynamic, i.e., the permitted rate for the mirror service may change as conditions change, e.g., the extent to which QoS guarantees are being met.

Figure 5:
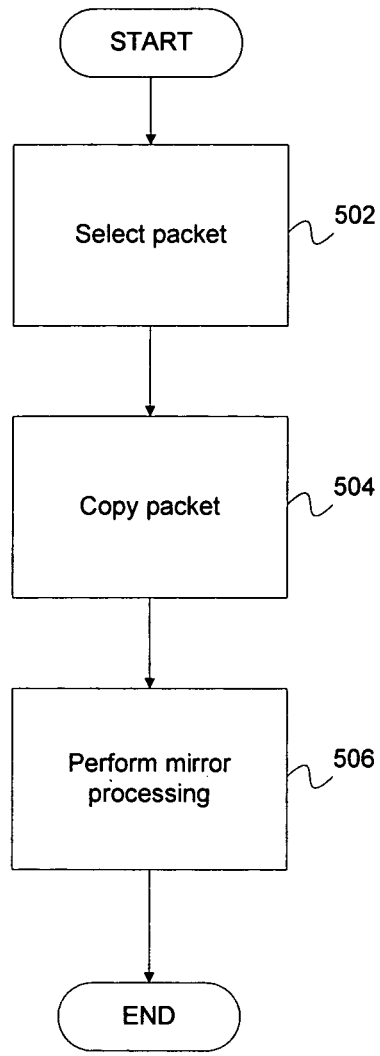
FIG. 5 illustrates an exemplary process for packet mirroring.

FIG. 5 illustrates an exemplary process for packet mirroring. Here, an overall process is shown. First, a packet is identified or selected for mirroring (502). The packet is copied (504). Mirror processing is then performed on the packet (or copy, depending on the implementation) (506). A packet may be selected for mirroring by logic included with forwarding engine 202 (FIG. 2), e.g., mirroring module 204, or a logic module that may be implemented as another part of system 100 (FIG. 1). In some embodiments, a mirror source object or process is configured to identify packets to be mirrored, based on criteria provided, e.g., by a network administrator. In some embodiments, a "debug" or other CLI is provided to enable an administrator to provide criteria for packet mirroring. Packet selection for mirroring may be random, according to a criterion or a set of criteria. Criteria may be user or system-specified. Examples of criteria for packet selection may include port, service delimiters (e.g., VLAN tag,), MPLS or VC label, MAC or IP addresses specified on an access control list (ACL). Other examples may include criteria that specify traffic flows within a particular service. Such examples may include MAC addresses, IEEE 802.1p value and ranges, source and destination MAC addresses and ranges, Ethernet values and ranges, etc. Still other examples may include source and destination IP addresses and ranges, IP protocol values, source and destination port values and ranges, Diff-Serv Code Point (DSCP) values, IP fragments, IP options values and ranges, single or multiple IP options fields, and TCP ACK and SYN commands (e.g., set, reset, etc.). Other criteria beyond those described above may be used for packet selection. Criteria may also be used to limit packet selection.

Mirror processing as in step 506 of FIG. 5 includes determining and performing the packet handling required to send the mirror packets to the mirror destination. In some embodiments, a mirror source object or process used to send mirror packets to an associated mirror destination translates the mirror packets into a form (e.g., frame type, encapsulation, etc.) that the mirror source knows the mirror destination (e.g., SDP, SAP) expects to see.

Figure 6:
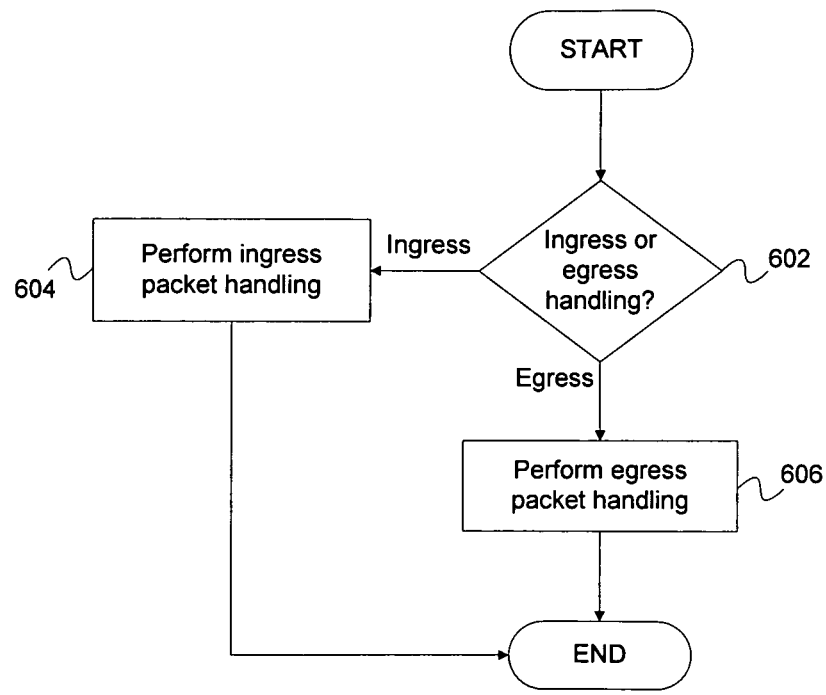
FIG. 6 illustrates an exemplary flow diagram for packet mirroring.

FIG. 6 illustrates an exemplary flow diagram for packet mirroring. In this example, a process is shown for determining the type of packet handling. Here, a decision is made as to whether a packet is to be mirrored at an ingress or an egress point relative to a switch fabric (602). If an ingress point is selected for mirroring, then ingress packet handling is performed (604). If an egress point is selected for mirroring, then egress packet handling is performed (606). Ingress packet handling is described in greater detail in connection with FIG. 7. Egress packet handling is also described in greater detail in connection with FIG. 8.

Figure 7:
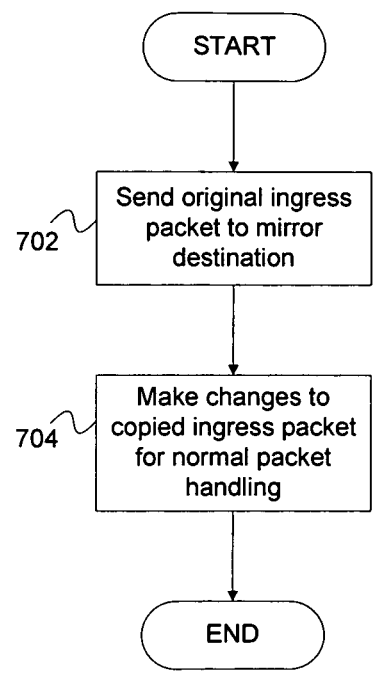
FIG. 7 illustrates an exemplary process for ingress packet handling.

FIG. 7 illustrates an exemplary process for ingress packet handling. If mirroring is to be performed at an ingress point, then an original packet as seen on the wire may be sent to a mirror destination, as in this example (702). In addition to forwarding the original packet to a mirror destination, changes may also be made to the packet copy made in step 504 of FIG. 5 (704). The packet copy may be processed normally, eventually arriving at the destination host port or service. In other words, the copy replaces the original packet and is processed accordingly and forwarded to the original host or destination. In contrast, the original packet may be designated as a mirrored packet, in the case of ingress packet handling. In this example, the mirrored packet is encapsulated and routed to a mirror destination. Routing and forwarding of the original packet to the mirror destination may include encapsulating the packet with additional headers, labels or other information. The added encapsulation may be used to route packets to a mirror destination across services such as VPLS, MPLS, etc.

Figure 8:
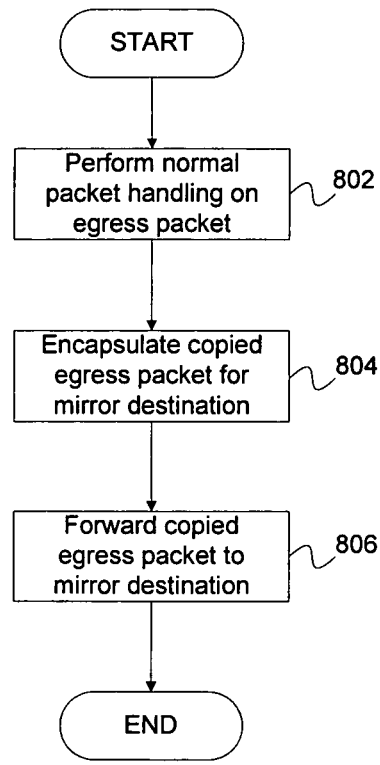
FIG. 8 illustrates an exemplary process for egress packet handling.

FIG. 8 illustrates an exemplary process for egress packet handling. Unlike ingress packet handling, normal handling is performed on the original packet (egress packet), in this example (802). Here, the copy of the packet made in FIG. 5 is encapsulated for routing to a mirror destination (804). Once encapsulated with any additional headers or labels, the original/egress packet is forwarded to a mirror destination (806). In this example, the original packet is mirrored upon egress from the switch fabric of the network. At this point, the copy is made (per FIG. 5), encapsulated, and forwarded to the mirror destination. Also at this point, the original/egress packet is processed normally and forwarded to its original destination.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for packet mirroring, comprising:
    selecting a packet to mirror from a plurality of packets received at a node based on a mirroring criterion, the selected packet being associated with a service provided through a network;
    selecting one of a plurality of mirror points of the node based on the mirroring criterion, each of the mirror points being within a transport path for the service;
    preparing a mirrored packet of the selected packet at the selected mirror point;
    sending the mirrored packet to a mirror destination from the selected mirror point using a mirror service provided through the network at least via a transport tunnel; and
    fulfilling a quality of service guarantee for the service provided through the network and associated with the selected packet to mirror at least in part by truncating the selected packet prior to sending it via the mirror service, wherein the selected packet is an Internet Protocol packet, truncating the selected packet includes alleviating packet mirroring induced increased network congestion interfering with a fulfilment of the quality of service guarantee by truncating content included in the Internet Protocol packet as being oversized to fulfill the quality of service guarantee for the service provided through the network and associated with the selected packet to mirror, and truncating the selected packet includes truncating the Internet Protocol packet that has been received at the node;
    wherein fulfilling the quality of service guarantee includes limiting a rate at which mirrored packets are sent via the mirror service and limiting the rate includes dynamically adjusting a rate limit based on the fulfilment of the quality of service guarantee interfered by packet mirroring; and
    wherein selecting the selected packet further includes identifying the selected packet based on one or more of the following: a user-specified criterion, a system-specified criterion, a set of criteria, port information, a delimiter, a protocol, a label, a service or other tag, a list, an address, an option value, and a protocol command.

2. A method as recited in claim 1 further including encapsulating the mirrored packet for transmission to the mirror destination.

3. A method as recited in claim 2 wherein encapsulating the mirrored packet includes adding information for routing the mirrored packet via the mirror service.

4. A method as recited in claim 2 wherein encapsulating the mirrored packet includes adding a header to the mirrored packet.

5. A method as recited in claim 1 wherein preparing the mirrored packet further includes copying the original packet.

6. A method as recited in claim 1 wherein preparing the mirrored packet further includes performing mirror processing on the packet.

7. A method as recited in claim 1 wherein sending the mirrored packet to the mirror destination includes sending the mirrored packet to a far end router associated with the mirror service.

8. A method as recited in claim 1 wherein sending the mirrored packet to the mirror destination includes sending the mirrored packet to a service distribution point associated with the mirror service.

9. A method as recited in claim 1 wherein the mirror destination translates the mirrored packet.

10. A method as recited in claim 1 wherein the service includes a service path.

11. A method as recited in claim 1 wherein the service includes a service tunnel.

12. A method as recited in claim 1, wherein the plurality of mirror points comprise a first mirror point at an ingress point where the selected packet enters the node.

13. A method as recited in claim 1, wherein the plurality of mirror points comprise a first mirror point at an egress point where the selected packet exits the node.

14. A system for packet mirroring, comprising:
    a processor configured to
        select a packet to mirror from a plurality of packets received at a node based on a mirroring criterion, the selected packet being associated with a service provided through a network;
        select one of a plurality of mirror points of the node based on the mirroring criterion, each of the mirror points being within a transport path for the service;
        prepare a mirrored packet of the selected packet at the selected mirror point;
        send the mirrored packet to a mirror destination from the selected mirror point using a mirror service provided through the network at least via a transport tunnel; and
        fulfil a quality of service guarantee for the service provided through the network and associated with the selected packet to mirror at least in part by truncate the selected packet prior to sending it via the mirror service, wherein the selected packet is an Internet Protocol packet, truncating the selected packet includes alleviating packet mirroring induced increased network congestion interfering with a fulfilment of the quality of service guarantee by truncating content included in the Internet Protocol packet as being oversized to fulfill the quality of service guarantee for the service provided through the network and associated with the selected packet to mirror, and truncating the selected packet includes truncating the Internet Protocol packet that has been received at the node, and wherein fulfilling the quality of service guarantee includes limiting a rate at which mirrored packets are sent via the mirror service and limiting the rate includes dynamically adjusting a rate limit based on the fulfilment of the quality of service guarantee interfered by packet mirroring; and wherein selecting the selected packet further includes identifying the selected packet based on one or more of the following: a user-specified criterion, a system-specified criterion, a set of criteria, port information, a delimiter, a protocol, a label, a service or other tag, a list, an address, an option value, and a protocol command; and a memory coupled to the processor and configured to provide the processor with instructions.

15. A system as recited in claim 14 wherein the processor is further configured to encapsulate the mirrored packet for transmission to the mirror destination.

16. A system as recited in claim 15 wherein encapsulating the mirrored packet includes adding to the mirrored packet one or more of the following: a header; and information for routing the mirrored packet via the mirror service.

17. A system as recited in claim 14 wherein the mirroring criterion comprises one or more of the following: a user-specified criterion; a system-specified criterion; a set of criteria; port information; a delimiter; a protocol; a label; a service or other tag; a list; an address; an option value; and a protocol command.

18. A system as recited in claim 14, wherein the service includes a service path.

19. A system as recited in claim 14, wherein the service includes a service tunnel.

20. A computer program product for packet mirroring, the computer program being embodied in a non-transitory computer readable storage medium and comprising computer instructions for:

selecting a packet to mirror from a plurality of packets received at a node based on a mirroring criterion, the selected packet being associated with a service provided through a network;

selecting one of a plurality of mirror points of the node based on the mirroring criterion, each of the mirror points being within a transport path for the service;

preparing a mirrored packet of the selected packet at the selected mirror point;

sending the mirrored packet to a mirror destination from the selected mirror point using a mirror service provided through the network at least via a transport tunnel; and fulfilling a quality of service guarantee for the service provided through the network and associated with the selected packet to mirror at least in part by truncating the selected packet prior to sending it via the mirror service, wherein the selected packet is an Internet Protocol packet, truncating the selected packet includes alleviating packet mirroring induced increased network congestion interfering with a fulfilment of the quality of service guarantee by truncating content included in the Internet Protocol packet as being oversized to fulfill the quality of service guarantee for the service provided through the network and associated with the selected packet to mirror, and truncating the selected packet includes truncating the Internet Protocol packet that has been received at the node;

wherein fulfilling the quality of service guarantee includes limiting a rate at which mirrored packets are sent via the mirror service and limiting the rate includes dynamically adjusting a rate limit based on the fulfilment of the quality of service guarantee interfered by packet mirroring; and wherein selecting the selected packet further includes identifying the selected packet based on one or more of the following: a user-specified criterion, a system-specified criterion, a set of criteria, port information, a delimiter, a protocol, a label, a service or other tag, a list, an address, an option value, and a protocol command.

21. A computer program product as recited in claim 20, further comprising computer instructions for encapsulating the mirrored packet for transmission to the mirror destination.

* * * * *